United States Patent [19]

Lukas

[11] Patent Number: 5,620,146
[45] Date of Patent: Apr. 15, 1997

[54] GLASS BOTTLE PULVERIZING METHOD AND APPARATUS

[76] Inventor: Donald E. Lukas, 520 Industrial Dr., Woodstock, Ga. 30188

[21] Appl. No.: 500,969

[22] PCT Filed: Dec. 8, 1993

[86] PCT No.: PCT/US93/11944

§ 371 Date: Aug. 7, 1995

§ 102(e) Date: Aug. 7, 1995

[87] PCT Pub. No.: WO95/16520

PCT Pub. Date: Jun. 22, 1995

[51] Int. Cl.⁶ .................................................. B02C 19/14
[52] U.S. Cl. ............................ 241/99; 241/100; 241/189.1
[58] Field of Search ............................ 241/99, 100, 189.1, 241/195, 30

[56] References Cited

U.S. PATENT DOCUMENTS

| | | |
|---|---|---|
| 2,342,495 | 2/1944 | Sacco . |
| 2,558,255 | 6/1951 | Johnson et al. . |
| 3,814,332 | 6/1974 | Nakao ................................... 241/38 |
| 3,938,745 | 2/1976 | Gladwin ................................ 241/99 |
| 3,987,972 | 10/1976 | Gladwin .............................. 241/99 |
| 4,088,274 | 5/1978 | Smith .................................... 241/99 |
| 4,226,377 | 10/1980 | Shelton ................................ 241/99 |
| 4,391,413 | 7/1983 | Pack ..................................... 241/99 |
| 4,573,641 | 3/1986 | DeWoolfson et al. .............. 241/36 |
| 4,655,404 | 4/1987 | Deklerow ............................. 241/99 |
| 4,819,883 | 4/1989 | Weil et al. ............................ 241/99 |
| 5,042,724 | 8/1991 | Perry .................................... 241/19 |
| 5,076,505 | 12/1991 | Petrocy ............................... 241/99 |
| 5,092,527 | 3/1992 | Perry et al. ......................... 241/19 |
| 5,205,497 | 4/1993 | Deklerow ............................ 241/36 |
| 5,226,606 | 7/1993 | Jasperson et al. .................. 241/99 |
| 5,242,126 | 9/1993 | Bomze ................................ 241/94 |
| 5,289,980 | 3/1994 | Shinpo et al. ...................... 241/99 |
| 5,328,106 | 7/1994 | Griffin et al. ...................... 241/99 |
| 5,372,317 | 12/1994 | Willis ................................. 241/99 |

*Primary Examiner*—John M. Husar
*Attorney, Agent, or Firm*—Isaf, Vaughan & Kerr

[57] ABSTRACT

The present invention is a method and apparatus for pulverizing empty glass bottles into small fragments of a predetermined maximum size to reduce greatly the storage and handling problems associated in the past with empty bottles. The apparatus comprises a cabinet (11) having a vertical passageway (17) through which bottles are delivered to a pulverizing station (36) where the bottles are smashed into small fragments. The pulverizing station includes a spinning metal pulverizing blade (37) surrounded and partially enclosed by a tapered metal cowl (38). The spinning blade and cowl together ensure that bottles are pulverized completely and into fragments of at most a predetermined maximum size before being deposited into a receptacle (43) that underlies the pulverizing station. Split rubber diaphragms (17, 48 and 49) and a brush filter (67) are disposed along the length of the passageway and prevent the escape of glass fragments and glass dust through the passageway and into the atmosphere.

8 Claims, 5 Drawing Sheets

GLASS BOTTLE PULVERIZING METHOD AND APPARATUS

TECHNICAL FIELD

This invention relates generally to waste disposal and more particularly to the on-site disposal in bars, restaurants and the like, of used glass beer, soda, and other bottles.

BACKGROUND OF THE INVENTION

The on-site disposal of empty glass containers such as beer bottles, soft drink bottles, and the like, has long posed handling and storage problems for bars, restaurants and other establishments where large numbers of glass bottles can accumulate. Such problems have been accentuated in recent years by the growing international recycling movement, which encourages the recycling of glass bottles as an alternative to discarding them at land fills and other dump sights. Obviously, glass bottles retained for recycling purposes must be stored until they can be picked up for transport to a recycling site. Accordingly, valuable floor space often must be utilized to store the empty bottles in crates or other containers on the premises until such time that they can be delivered to or picked up by a recycling center. The dedication of such storage space can become an acute problem in bars and restaurants where large numbers of empty glass bottles can result from even one evening's operation.

Even at non-recycling establishments where glass bottles are simply discarded with other trash in a dumpster such that on-site storage is less of a problem, undue amounts of time and effort still must be expended in handling and transporting the bottles. In a bar, for example, local trash receptacles positioned behind the bar for receiving empty bottles tend to be filled quickly since each empty bottle takes up a large volume in the receptacle. Consequently, such receptacles must be carried manually and frequently to a dumpster that is often located in an alley behind the building. Thus, valuable time that could be used waiting on customers often is devoted to transporting and discarding empty glass bottles. Furthermore, trash cans and other receptacles located behind the bar for receiving the empty glass bottles tend to take up valuable space and interfere with the efficient movement of the bartender or waiter. Even where glass bottles are stored temporarily on-site for recycling, they still must be collected in small lots behind the bar and transported frequently to a storage area to await delivery to or pick up by a recycling concern.

Thus, a continuing and heretofore unaddressed need persists for an apparatus and methodology adapted to address effectively and economically the aforementioned and other problems associated with the storage, disposal, and recycling of empty glass bottles in bars, restaurants, and the like. It is to the provision of such a methodology and an implementing apparatus that the present invention is primarily directed.

SUMMARY OF THE INVENTION

Briefly described, the present invention, in one preferred embodiment thereof, comprises an apparatus for receiving empty glass bottles and pulverizing the bottles into small fragments that are then deposited in a receptacle. The apparatus comprises a cabinet or housing that is separated by an interior partition into an upper chamber and a lower chamber. The lower chamber houses a pulverizing station that includes a heavy metal pulverizing blade adapted to be spun rapidly in a horizontal plane just beneath the interior partition. An inwardly tapered annular metal cowl depends from the underside of the partition extending about and partially enclosing the spinning pulverizing blade. A flexible rubberized skirt extends from the lower rim of the cowl into a removable receptacle for receiving the small glass fragments that result from the pulverizing process.

An opening is formed in the partition overlaying the moving arms of the spinning pulverizing blade and a corresponding vertically aligned opening is formed in the top of the cabinet. A metal chute communicates between these two openings such that the openings and shoot together form a passageway extending from the top of the cabinet to the pulverizing station within the lower chamber of the cabinet. The passageway is sized to pass empty glass bottles to the pulverizing station and at least one split rubber diaphragm is disposed in the passageway to prevent broken glass from being ejected back up the passageway while simultaneously allowing glass bottles to be inserted through the passageway for smashing at the pulverizing station. In one embodiment, an annular brush with radially inwardly extending bristles is also disposed along the passageway. These bristles are densely packed but relatively flexible to allow the passage of bottles down the passageway but to prevent the movement up the passageway of fine glass dust that is often created during the pulverization process.

When activated for operation, the metal pulverizing blade of the apparatus spins at a high rate of rotation with its arms passing just beneath the lower end of the passageway formed by the top and partition openings and the chute that extends therebetween. Empty glass bottles can then be inserted into the passageway through the top of the cabinet and pressed through the split rubber diaphragm and annular brush that are disposed in the passageway. When pressed through the diaphragm and brush, the bottles fall through the passageway to the pulverizing station, where the rapidly moving arms of the spinning pulverizing blade strike and smash the bottles into small fragments. The annular tapered cowl that extends about and partially underlies the pulverizing blade functions to retain larger fragments of glass in the path of the spinning pulverizer blade where they are struck repeatedly by the moving arms of the blade and smashed into smaller and smaller fragments. When these fragments become smaller than a predetermined maximum size that is set by the size and configuration of the cowl, they fall downwardly out of the pulverizing station and are directed by the flexible chute into a waiting receptacle.

When filled with pulverized glass, the receptacle can simply be removed from the cabinet, emptied, and replaced in the cabinet for continued operation of the apparatus. It has been found that a relatively small 10 gallon receptacle can hold up to 220 pulverized bottles, which is many times the number of whole empty bottles that can be contained in a full size 30 gallon trash can. Accordingly, the receptacle of this invention takes up much less space and requires dumping much less often than conventional trash cans of the prior art.

Thus, it is an object of the present invention to provide a glass bottle pulverizing method and apparatus that greatly reduces the amount of storage space previously required for glass bottles.

Another object of the invention is to reduce greatly the time and effort previously required in handling and transporting empty glass bottles.

A further object of the invention is to provide an apparatus of the type described that fits neatly in a bar or other similar establishment and does not take up unnecessary space within the bar.

Another object of the invention is to provide a method of producing pulverized glass from bottles with the glass being in condition for direct recycling.

A further object of the invention is to provide a glass bottle pulverizing method and apparatus that is reliable, efficient, and economical with respect to prior art methods.

A still further object of the invention is to provide a glass pulverizer that effectively prevents glass fragments and glass dust generated during the pulverizing process from escaping from the pulverizing device through its feeder chute.

These and other objects, features, and advantages of this invention will become more apparent upon review of the herein contained detailed description when taken in conjunction with the accompanying drawings.

DETAILED DESCRIPTION OF THE PREFERRED EMBODIMENT

Figure 1:
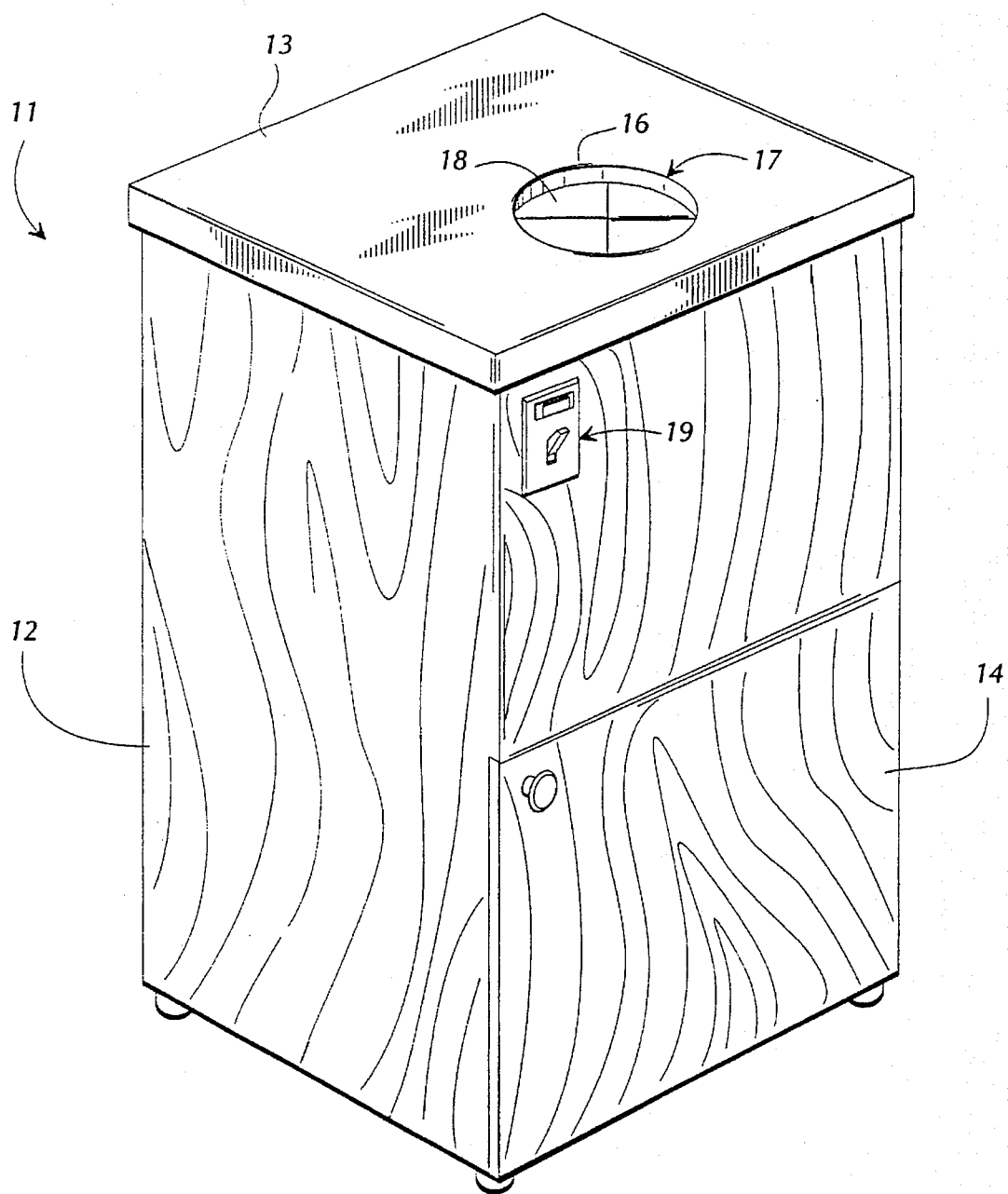
FIG. 1 is a perspective view illustrating the external appearance of an apparatus that embodies principals of this invention in a preferred form.

Referring now in more detail to the drawings, in which like numerals refer to like parts throughout the several views, FIG. 1 depicts the external appearance of an apparatus that embodies principals of the present invention in a preferred form. The apparatus 11 is seen to include a substantially closed rectangular cabinet or housing 12 having a top 13 and a hinged access door 14. A safety switch 30 (FIG. 2) is positioned in the cabinet to be activated when the door 14 is shut to allow normal operation of the apparatus and deactivated when the door is opened to prevent operation of the apparatus when accessing the interior of the cabinet for cleaning or emptying. The cabinet 12 is preferably sized to be installed in a bar or the like with its top 13 being substantially coextensive with the upper surface of the bar. In this way, the cabinet becomes an installed fixture of the bar similar to a dishwasher and does not take up valuable working space behind the bar as trash cans often do.

The top 13 of the cabinet 12 is formed with a circular opening 16 that preferably is forwardly displaced as shown. The opening 16 is sized to receive empty glass bottles such as beer bottles, soda bottles, and the like. A split rubber diaphragm 17 having resilient flaps 18 spans the opening 16 to allow bottles to be pressed through the opening 16 while preventing pieces of broken glass from being ejected out of the opening from the interior of the cabinet as detailed more fully below. A switch 19 for activating the apparatus is provided on the front of the cabinet. The switch 19 is conveniently located and preferably lighted or includes a pilot light so that the operating status of the apparatus can easily be determined at a glance.

Figure 2:
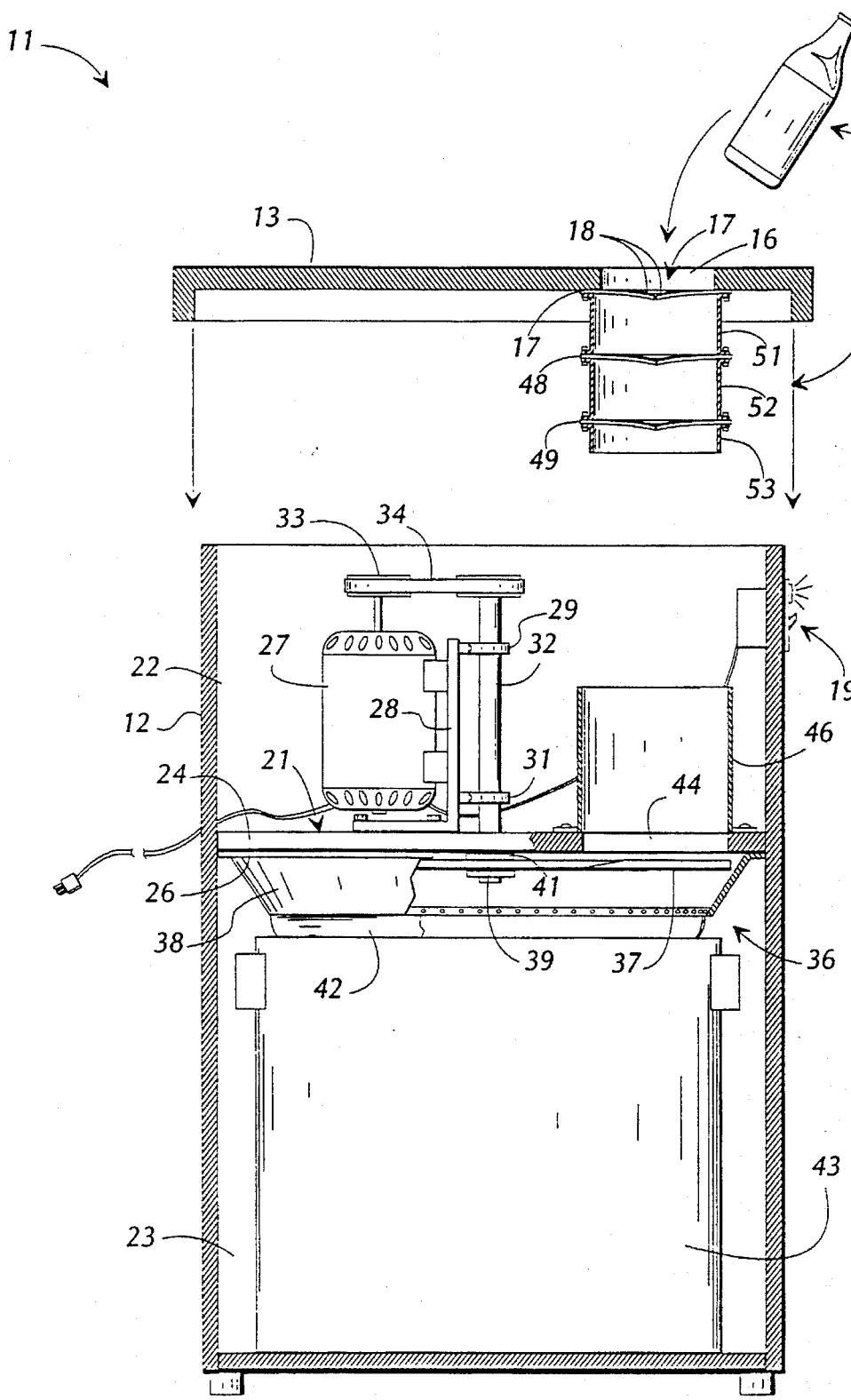
FIG. 2 is a cutaway side view as seen from the left in FIG. 1 and partially in section, illustrating a preferred configuration of functional elements of this invention.

FIG. 2 is a cutaway view of the present invention as seen from the left in FIG. 1, and shown partially in section. The cabinet 12 is seen to be formed with an interior partition 21 that separates or segregates the interior of the cabinet into an upper chamber 22 and a lower chamber 23. In the preferred embodiment, the cabinet 12 is formed of laminate covered plywood and the partition 21 is formed of plywood 24 having a stainless steel or other metal sheet 26 bonded to the lower surface thereof. The metal sheet 26 forms a part of the pulverizing station and protects the wood of partition 21 from destruction by breaking glass bottles as detailed more fully below.

Although the preferred embodiment is constructed of plywood because of its sound deadening characteristics and covered with plastic laminate for appearance, it will be understood that any other suitable construction materials, such as sheet metal, might also be used with comparable results. Accordingly, the plywood construction of the preferred embodiment should not be interpreted as a limitation upon the scope of this invention but only exemplary of a preferred construction material.

The upper chamber 22 of the cabinet 12 houses a conventional electric motor 27 that is mounted to a rigid bracket 28 that, in turn, is secured by means of bolts or the like to the upper surface of partition 21. Vertically spaced bearing blocks 29 and 31 are also mounted to the bracket 28. Each of the bearing blocks 29 and 31 preferably house a sealed, self-aligning ball-bearing (not shown) with the bearings together supporting a vertically extending drive shaft 32 for rotation about its longitudinal axis. The lower end portion of the drive shaft 32 extends through a corresponding hole in the partition 21 and into the lower chamber 23. The drive shaft 32 is coupled at its upper end to the electric motor 27 by means of sheaves 33 and pulley belt 34. Obviously, activation of the electric motor 27 by means of the switch 19 causes the drive shaft 32 to rotate rapidly about its longitudinal axis.

Figure 3:
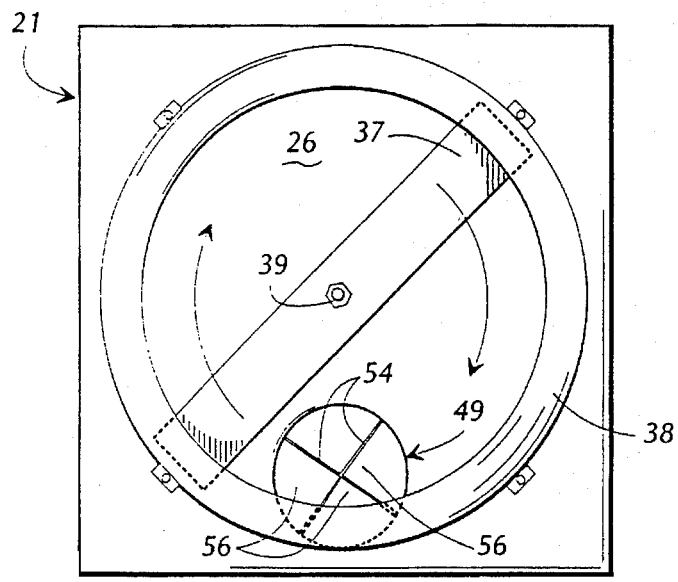
FIG. 3 is a view of the pulverizing station of the invention as seen from the lower chamber of the cabinet thereof.

Disposed just below the partition 21 in the lower chamber 23 is the pulverizing station 36 of the apparatus 11. The pulverizing station 36 is comprised of metal plate 26 in conjunction with an elongated metal pulverizing blade 37 that is bounded and partially enclosed by a generally annular tapered metal cowl 38. The pulverizing blade 37 preferably is fabricated of half-inch steel or other suitably dense material and is formed in the shape of an elongated rectangular bar as best seen in FIG. 3. The blade 37 is securely mounted to the lower end portion of drive shaft 32 by means of a nut 39 or other suitable fastener. In this way, rotation of the drive shaft 32 by electric motor 27 causes the pulverizing blade 37 to spin rapidly in a horizontal plane just below the partition 21 as indicated by the arrows in FIG. 3.

The tapered annular cowl 38 preferably is formed of stainless steel or other suitable material to resist corrosion. The cowl 38 is secured to the underside of partition 21 and extends downwardly therefrom to surround the pulverizing blade 37 as it spins beneath the partition 21. The lower peripheral rim of the cowl 38 has a diameter that is less than the length of pulverizing blade 37 such that a portion of the cowl 38 underlies and partially encloses the tips of the blade 37 as best seen in FIG. 3. This configuration insures that glass fragments are maintained in the path of the moving arms of spinning blade 37 where they can be struck repeatedly to reduce them to small fragments that are at most a predetermined maximum size.

While a number of suitable materials may be used in fabricating the plate 26, blade 37, and cowl 38, it has been found preferable that these elements be made of stainless steel, which resists corrosion and provides strength and durability. It has also been found desirable to provide a suitable seal 41 that functions to prevent fine glass particles and glass dust from migrating into the upper chamber 22 through the hole provided for the drive shaft 32 in the partition 21.

A flexible rubber skirt 42 is secured about the lower peripheral rim of the cowl 36 and extends downwardly into a suitable receptacle 43. With this configuration, pulverized glass fragments from the pulverizing station 36 are directed by the skirt 42 into the receptacle 43. In the preferred embodiment, the receptacle 43 is disposed in the lower chamber 23 behind the access door 14 (FIG. 1) such that, when full, the receptacle can easily be removed, emptied, and replaced for subsequent use of the invention.

Figure 4:
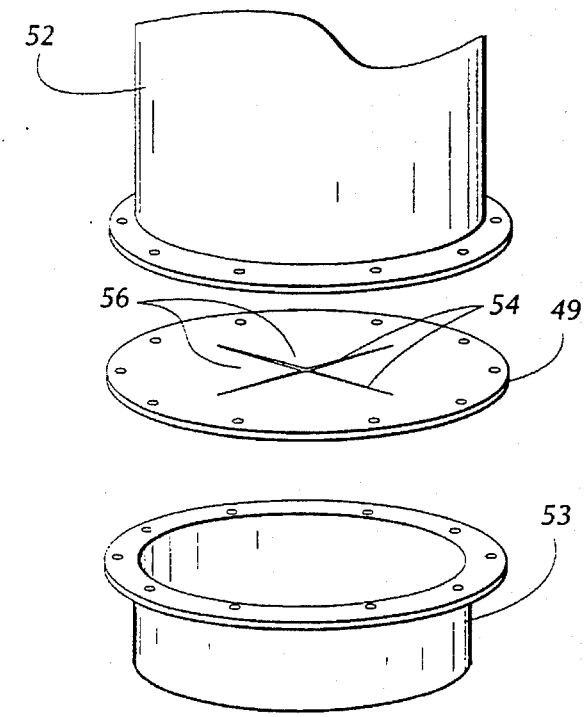
FIG. 4 illustrates a preferred method of constructing the chute of this invention with split rubber diaphragms disposed therein.

A circular opening 44 is formed in the partition 21 and is positioned to underlie and vertically align with the top opening 16 when the top is in place on the cabinet 12. A cylindrical steel sleeve 46 is mounted within the opening 44 and extends upwardly therefrom to a position intermediate the partition 21 and the top of the cabinet 12. A corresponding chute assembly 47 is secured to the lower side of top 13 surrounding and extending downwardly from the opening 16 formed therein. As best illustrated in FIGS. 2 and 4, the chute assembly 47 comprises split rubber diaphragms or sheets 48 and 49 sandwiched and secured between respective flanged chute sections 51, 52, and 53. As previously discussed, a similar split rubber diaphragm 17 is sandwiched between the upper flange of chute section 51 and the lower side of cabinet top 13 as shown in FIG. 2.

The lower chute section 53 extends downwardly from chute assembly 47 and has an outer diameter slightly less than the inner diameter of sleeve 46. In this way, the chute section 53 telescopes tightly and securely into the top of sleeve 46 when the top 13 is placed on the cabinet 12 as indicated by the arrows in FIG. 1. Accordingly, the chute assembly 47 and sleeve 46, when coupled together, define a passageway communicating between the cabinet top opening 16 and the lower chamber of the cabinet 12. Glass bottles inserted in the top opening 16 and pressed through the split rubber diaphragms 17, 48, and 49 are thus delivered through the passageway directly to the pulverizing station 36 as is apparent from FIG. 2.

As best illustrated in FIGS. 3 and 4, each of the split rubber diaphragms has intersecting slits 54 that define in the sheet four resilient rubber flaps 56. The rubber diaphragms 17, 48, and 49 are preferably fabricated of silicon rubber that is about one-half inch thick. In this way, the flaps formed in the rubber sheets are sufficiently flexible to allow glass bottles to be pressed through them and thus through the chute assembly 47 while at the same time exhibiting sufficient rigidity to prevent broken glass fragments from being ejected back through the chute assembly 47. In addition, the opening 44 in the partition 24 is positioned to overlay the path of the moving arms of spinning pulverizing blade 37 and partially to overlay the metal cowl 38 as best illustrated in FIG. 3.

Figure 5:
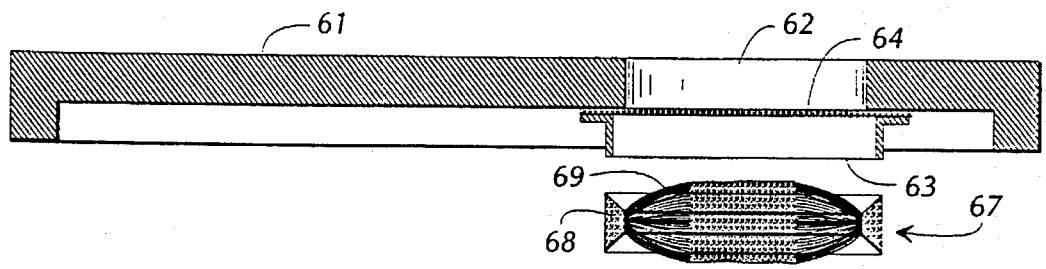
FIG. 5 is an exploded view of the top and chute of the invention showing a chute embodiment for preventing escape of glass dust through the chute.
Figure 6:
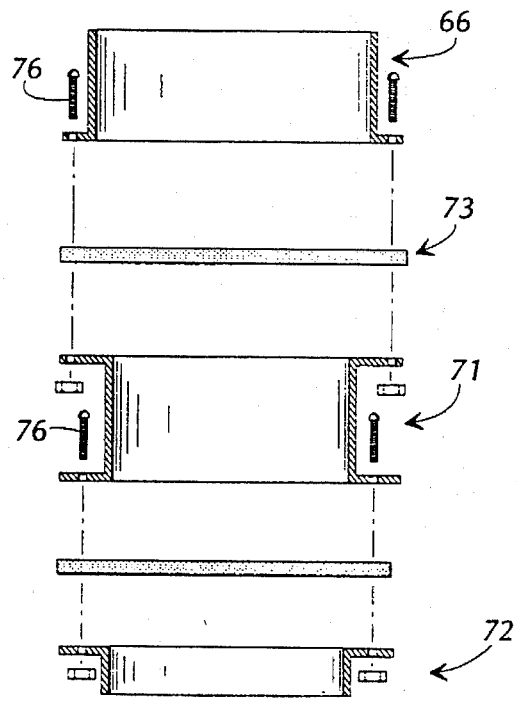
FIG. 6 shows the annular brush filter for use in the embodiment of FIG. 5.
Figure 6:
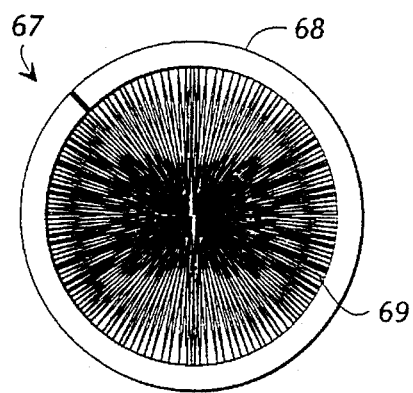
Figure 7:
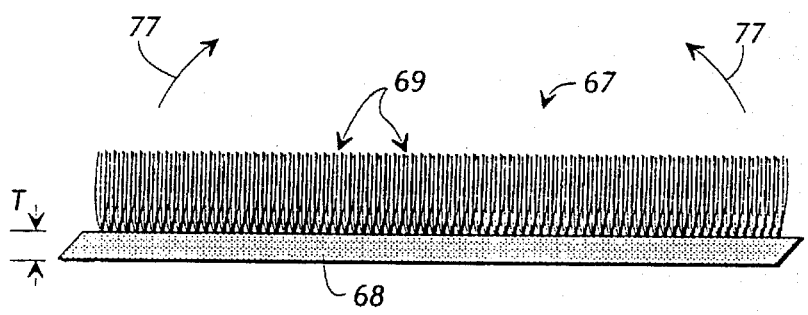
FIG. 7 illustrates a preferred fabrication of the brush filter of FIG. 6.

FIGS. 5–7 illustrate an alternate embodiment of the glass bottle chute of this invention, specifically designed to prevent the migration of small airborne glass dust back through the chute as bottles are pulverized in the machine. In this embodiment, the top 61 of the device is provided with an opening 62 for insertion of bottles through the top and into the machine as with previous embodiments. Bolted to the bottom of the top 61 and axially aligned with the opening 62 is a stainless steel flanged coupler ring 63, which depends downwardly from the top 61. Sandwiched between the flanges of the coupler ring 63 and the top 61 is a first split rubber diaphragm 64, which functions as previously described to allow bottles to be inserted through the opening and prevent glass fragments from being ejected back through the opening.

A first generally annular flanged chute section 66 is sized to be telescopically received onto the coupling ring 63 when the chute section 66 and coupling ring 63 are brought together. Specifically, the inside diameter of the chute section 66 is substantially the same as the outside diameter of the coupling ring 63. In this way, the coupling ring 63 slides into the chute section 66 when the two are brought together.

A brush filter 67 is designed and sized to fit snugly within the first chute section 66 and is adapted to prevent the migration of small airborne glass dust back through the chute and into the atmosphere. Specifically, the brush filter 67, which is described in more detail below, comprises an annular hard rubber support ring 68 from which a multitude of bristles 69 inwardly extend. As best seen in FIG. 6, the bristles 69 of the brush filter 67 extend radially inwardly toward the axis of the support ring with the free ends of the bristles meeting with each other at the center of the brush filter. With this configuration, it will be seen that the bristles 69 of the brush filter 67 define a dense barrier in the chute through which airborne glass dust cannot pass. However, the bristle 69 of the brush filter 67 are flexible enough to allow easy passage of a glass bottle through the chute. As a bottle passes through the brush filter 67, the bristles flex downwardly to allow passage of the bottle but bear firmly against the surface of the bottle to prevent any accidental escape of dust through the chute as the bottle is inserted through the brush filter.

As illustrated in FIG. 5, the coupler ring 63 and first chute section 66 have radii that are larger than the radius of the opening 62 and the top 61. Specifically, the radius of each of these elements is substantially equal to the radius of the opening 62 plus the thickness of the rubberized support ring 68 of the brush filter 67, as indicated by the designation "T" in FIG. 7. Therefore, when the assembly is brought together to form the chute, the diameter of opening 62 substantially corresponds to the inner diameter of the rubberized support ring 68. In this way, the support ring 68 of the brush 67 does not constrict the overall diameter of the chute and thus does not restrict movement of glass bottles through the chute.

As with previous embodiments, second and third flanged chute sections 71 and 72 respectively are adapted to be affixed to the chute section 66 to form a unitary continuous chute assembly. Also, as with previous embodiments, split rubber diaphragms 73 and 74 are sized and adapted to be sandwiched between the chute sections when they are coupled together by means of bolts 76. The inside diameters of chute section 71 and 72 correspond to the diameter of opening 62 in the top 61 and also correspond to the inside diameter of the rubberized support ring 68 of the brush filter 67. In this way, the minimum inside diameter of the chute, when assembled, is the same throughout its length so that no obstructions to the passage of bottles are present within the chute.

FIG. 7 illustrates a preferred fabrication of the filter brush 67 that has proven to be economical to produce and efficient in use. Specifically, the rubberized support ring 68 is formed as a continuous linear belt and bristles 69 are embedded within the belt and extend upwardly therefrom. The ends of the ring 68 are cut at an angle as shown in FIG. 7 so that when the brush is curled around upon itself as indicated by arrows 77 to form the annular configuration of FIG. 6, the ends of the belt meet in a clean fashion forming a continuous annular support ring from which the brushes inwardly extend to form the brush filter.

Figure 8:
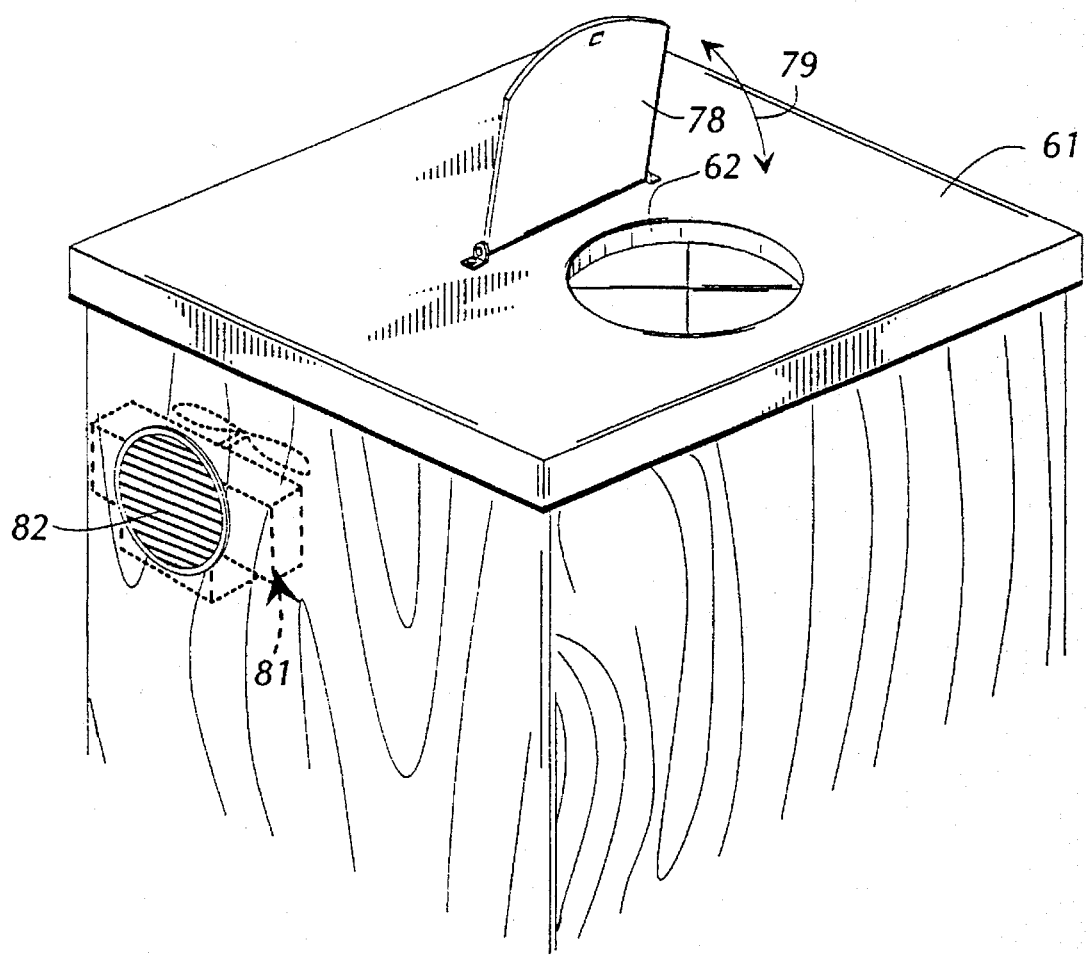
FIG. 8 illustrates the top portion of the invention showing the safety door and cooling fan assembly.

FIG. 8 illustrates yet another embodiment of the present invention having a hinged safety door that covers the opening in the top of the housing and a cooling fan that removes heat from the upper chamber of the housing. Specifically, a door 78 is hingedly affixed to the top 61 and, when hinged downwardly to its closed position as indicated by arrow 79, covers the opening 62 in the top 61. The door 78 serves to prevent unwanted objects from falling into the chute and also serves as a safety feature that helps to prevent children and others from inserting hands into the chute.

Also provided in the embodiment of FIG. 8 is a cooling fan 81. The cooling fan 81 is mounted on the inside of the housing's upper chamber adjacent to a vent 82. In operation, the fan draws cooling air through the vent to which it is adjacent and directs the air stream onto the electric motor within the upper chamber. This air then cools the motor and is passed out of the upper chamber through a second vent that is mounted on the other side of the housing. In this way, the motor and bearings can function continuously without associated heat stress.

Operation

As previously described, the apparatus of this invention preferably is mounted in a bar or other similar establishment with its top 13 being coextensive with the upper surface of the bar. The invention thus becomes a built-in appliance of the bar. When one or more empty glass bottles 57 is to be discarded, the apparatus is switched on by means of switch 19, which activates electric motor 27 to rotate drive shaft 32 and thus spin pulverizing blade 37 rapidly within the pulverizing station 36. After a time sufficient to allow the pulverizing blade to reach full speed, bottles 57 are simply pressed through the split rubber diaphragms 17, 48, and 49 until they fall through the passageway defined by chute assembly 47 and sleeve 46 and into the pulverizing station 36.

At the pulverizing station, the glass bottles are struck with massive momentum by the fast moving arms of the spinning pulverizing blade 37. The bottles are thus smashed and begin to shatter and break into fragments within the pulverizing station 36. The configuration and placement of the tapered annular cowl 38 in conjunction with centrifugal forces imparted by the blade to the glass fragments tends to maintain larger fragments of glass inside the cowl and in the path of the rapidly moving arms of the spinning pulverizing blade 37. These larger fragments are thus struck repeatedly by the blade and are smashed into smaller and smaller fragments. When the fragments are reduced to a size at most equal to a predetermined maximum size, they are free to slide down the sides of the cowl and through the flexible skirt into the receptacle.

The predetermined maximum size into which bottles are pulverized by the apparatus of this invention is determined primarily by the speed at which the blade is spun. However, the size is also affected by the diameter and configuration of the cowl 38. If, for example, the cowl is sized such that the tips of the blade 37 move in a circle close to the interior surface of the cowl, then bottles will be broken into relatively small fragments corresponding roughly in size to the space between the blade tips and the cowl surface. In general, greater distances between the tips of the pulverizing blade 37 and the interior surface of the cowl 38 results in correspondingly larger maximum sizes for the final pulverized fragments. Further, the angle of the cowl's taper as well as the extent to which it extends beneath and underlies the tips of the blade 37 and the opening 44 can also effect the size of the resulting pulverized glass fragments.

As the glass bottles are progressively pulverized at the pulverizing station 36, the resulting glass fragments are directed by the skirt 42 into a removable receptacle 43 positioned in the lower chamber of the cabinet 12. In the preferred embodiment, it has been found that a plastic ten-gallon receptacle holds about ten cases of empty bottles and fits neatly within the lower chamber 23 of the cabinet 12. With prior art methods, ten cases of empty bottles would require significant storage space and numerous trips from the bar to remove the bottles therefrom. Thus, the present invention preserves both storage space and handling time and effort.

The embodiment of FIGS. 5–7 functions in a similar fashion to the previously described embodiments. However, in this embodiment, the annular brush filter 67 is disposed between the first split rubber diaphragm 64 and the second split rubber diaphragm 73. As a glass bottle is inserted through the opening 62, it passes through the first diaphragm 64 and begins to move through the brush filter 67. As the bottle moves through the brush filter 67, the bristles of the filter are forced downwardly to allow the bottle to pass. However, the bristles 69 are stiff enough so that their ends bear firmly against the surface of the bottle as it passes through the filter. Thus, there are virtually no gaps or openings between the bottle and the bristles as the bottle moves through the filter.

When the bottle passes the filter 67, the bristles 69 spring back to their inwardly extending orientations as shown in FIG. 6. The bottle then moves on down through the chute, passing split rubber diaphragm 73 and 74 before being presented to the pulverizing station. At the pulverizing station, the bottle is smashed as previously described. The diaphragms 64, 73, and 74 effectively prevent any larger pieces of glass from being ejected back through the chute where they could injure users of the device. In addition, the closely packed bristles 69 of the brush filter 67 capture and prevent the escape of any very fine airborne glass dust that may be produced during the pulverizing process. As a result, none of the by-products of the pulverizing process are permitted to escape through the chute. In addition, the oversized coupling ring 63 and first-chute 66 insures that the brush filter 67 does not create an obstruction through the chute that can trap bottles or fragments therein.

In addition to solving problems related to storage and handling of glass bottles, the present invention also aids in recycling and conservation since empty glass bottles are reduced on-site to a granulated state highly suitable for direct insertion into a recycling furnace. In this regard, two or three of the devices of this invention could be used side-by-side to pulverize and segregate clear and colored glass bottles for direct recycling. This can be desirable since some recycling centers pay more for glass that is pre-pulverized and separated than for mere empty glass bottles.

The invention has been described herein in terms of preferred embodiments and methodologies. It will be obvious to those of skill in the art, however, that numerous additions, deletions, and modifications might well be made to the illustrated embodiments without departing from the spirit and scope of the invention as set forth in the claims.

I claim:

1. An apparatus for smashing glass objects into fragments of a predetermined maximum size and depositing the fragments in a receptacle for subsequent processing, said apparatus comprising:

a housing having a top and an internal partition subdividing the interior of said housing into an upper chamber and a lower chamber, said top being formed with an access opening sized to receive whole glass objects to be smashed;

said partition being formed with an opening that communicates between the upper and lower chambers of said housing, said partition opening being sized to pass whole glass objects to be smashed and being substantially vertically aligned with the access opening in said top of said housing;

moving pulverizer means within the lower chamber of said housing for striking glass objects as they pass through the opening in said partition and breaking the glass objects into fragments;

a substantially vertically oriented elongated chute extending from said top into said upper chamber and a substantially vertically oriented elongated sleeve extending from said partition into said upper chamber and being aligned with said chute for communicating between the access opening formed in said top of said housing and the opening formed in said partition, said chute and sleeve being sized to direct whole glass objects from the access opening in said top of said housing and through the opening in said partition for presentation to said pulverizer means for smashing;

at least two yieldable diaphragms disposed at predetermined spaced intervals substantially along the entire length of said chute with each of said diaphragms being sized and configured to grip and substantially seal about the exterior of glass objects as they pass progressively through said chute and to close off communication through said chute when a glass object moves beyond the diaphragm in the chute;

filter means disposed along the length of said chute for preventing migration of airborne glass dust through the chute as glass bottles are smashed by said moving pulverizer means, said filter means being configured to bear firmly against and substantially seal about the exterior surface of glass bottles as the bottles move past said filter means in said chute; and means for directing smashed glass fragments from said pulverizer means to the receptacle.

2. The apparatus of claim 1 and wherein said chute is generally cylindrical having a central axis and walls and wherein said filter means comprises a brush filter having bristles that extend radially inwardly from the walls of said chute toward the central axis of said chute.

3. The apparatus of claim 2 and wherein said bristles are embedded in an annular support ring disposed around the walls of said chute, said bristles extending radially inwardly from said annular support ring toward said central axis of said chute.

4. The apparatus of claim 3 and wherein said annular support ring is formed of a rubberized material.

5. The apparatus of claim 3 and wherein the diameter of said cylindrical chute is greater at the position of said brush filter to accommodate the thickness of said annular support ring.

6. The apparatus of claim 5 and wherein the diameter of said chute at the location of said brush filter is substantially twice the thickness of said annular support ring greater than the diameter of said chute at other locations therealong.

7. The apparatus of claim 1 and further comprising a door hingedly affixed to said top with said door being hingeably movable between a closed position covering said access opening and an open position displaced from said access opening.

8. The apparatus of claim 7 and further comprising cooling fan means in said upper chamber of said housing for ventilating said upper chamber and expelling unwanted built-up heat therefrom.

* * * * *